(12) United States Patent
Dyatlov et al.

(10) Patent No.: US 8,051,044 B1
(45) Date of Patent: Nov. 1, 2011

(54) METHOD AND SYSTEM FOR CONTINUOUS DATA PROTECTION

(75) Inventors: Dennis S. Dyatlov, Moscow (RU); Juri V. Tsibrovskyy, Moscow (RU); Maxim V. Lyadvinsky, Moscow (RU); Serguei M. Beloussov, Singapore (SG)

(73) Assignee: Acronis, Inc., Tortola (VG)

( * ) Notice: Subject to any disclaimer, the term of this patent is extended or adjusted under 35 U.S.C. 154(b) by 471 days.

(21) Appl. No.: 12/060,452

(22) Filed: Apr. 1, 2008

(51) Int. Cl.
G06F 17/30 (2006.01)
(52) U.S. Cl. ........ 707/646; 707/625; 707/648; 707/654; 707/682
(58) Field of Classification Search .................. 707/200, 707/204, 202, 205, 624, 644, 645, 646, 647, 707/649, 652, 654, 625, 648, 682
See application file for complete search history.

(56) References Cited

U.S. PATENT DOCUMENTS

| | | | |
|---|---|---|---|
| 7,406,488 B2 * | 7/2008 | Stager et al. | 707/999.001 |
| 7,523,149 B1 * | 4/2009 | Sridharan et al. | 707/999.204 |
| 7,549,027 B1 * | 6/2009 | McAndrews et al. | 711/161 |
| 7,613,750 B2 * | 11/2009 | Valiyaparambil et al. | 707/999.204 |
| 7,650,533 B1 * | 1/2010 | Saxena et al. | 714/6.12 |
| 7,680,843 B1 * | 3/2010 | Panchbudhe et al. | 707/999.204 |
| 7,707,373 B2 * | 4/2010 | Murayama et al. | 711/162 |
| 7,844,577 B2 * | 11/2010 | Becker et al. | 707/646 |
| 7,873,601 B1 * | 1/2011 | Kushwah | 707/654 |
| 2005/0216788 A1 * | 9/2005 | Mani-Meitav et al. | 714/6 |
| 2008/0244205 A1 * | 10/2008 | Amano et al. | 711/162 |
| 2010/0077160 A1 * | 3/2010 | Liu et al. | 711/162 |

* cited by examiner

*Primary Examiner* — Tim T Vo
*Assistant Examiner* — Dangelino Gortayo
(74) *Attorney, Agent, or Firm* — Bardmesser Law Group

(57) ABSTRACT

Continuous data protection is performed as two parallel processes: copying a data block from the storage device into the backup storage device (creating initial backup) and copying the data block to be written to the data storage into the incremental backup. When a write command is directed to a data storage block, it's intercepted and redirected to the backup storage, and data, which is to be written in accord to the write request, is written to the incremental backup on the backup storage. If write command is also directed to a data storage block identified for backup that has not yet been backed up, the identified data storage block is copied from the storage device to the intermediate storage device, the write command is executed on the identified data storage block from the storage device, and the data storage block is copied from the intermediate storage device to the backup storage device. In case of an error accessing a block on the storage device, the block is marked as invalid. The system suspends a write command to the storage device during the initial data backup process if the intermediate storage device has reached a selected data capacity; and copies a selected amount of data from the intermediate storage device to the backup storage device.

17 Claims, 17 Drawing Sheets

METHOD AND SYSTEM FOR CONTINUOUS DATA PROTECTION

BACKGROUND OF THE INVENTION

1. Field of the Invention

The present invention relates to continuous data protection, and more particularly, to continuously archiving data on storage devices and with preselected time intervals.

2. Background Art

Currently, there are a number of conventional methods that relate to organization of data archiving. One of these is a backup of the entire hard drive, which typically involves copying of the hard drive content onto some other medium, such as another hard disk drive, a DVD ROM, a DVD RAM, a flash disk, etc. The primary disadvantage of such a method is the need to backup what is frequently a very large amount of data, which, on the one hand, results in a relatively lengthy process of archiving, and, on the other hand, frequently requires relatively large available space for the archived data. This ultimately results in a relatively high cost of archiving per unit of archived data.

Another approach is often referred to as "incremental backup," which generally decreases the amount of space required for the archiving. With the incremental backup, typically the content of the hard disk drive is archived, or stored somewhere once. After that, only that data that has been changed, or added, since the previous backup, or since the pervious incremental backup, is actually archived. Recovery of data from the archive typically involves merging of the original backup and the various incremental backups.

For conventional backups it is possible to restore data to the point at which the backup was taken. In case of a system failure the data can be restored from the last incremental backup. In this case, data from the time of this incremental backup creation up to time of a system failure will be lost.

On the other hand, continuous data protection is different from traditional backups. In case of a continuous data protection an initial backup is created as in case of traditional backup, but new data (which is written on the storage device) is backed up in the incremental backup (so called a continuous incremental backup, or open-for-editing incremental backup) in parallel to writing on the storage device. In other words, data is backing up to the incremental backup during the process of data writing to the storage device, but not after the passage of some time, when a user decides to make a backup of data from the data storage device.

Vcom's Autosave provides a continuous data protection. However its technology is based on file level backup and thus its system cannot be restored after a critical system failure. Block level backup provides the backing up clusters on the data storage, but not the file as a whole, so, for a block level backup, less space is necessary.

Symantec's GoBack provides a continuous data protection on the block level backup. However, GoBack uses a buffer space for storage of its change files using FIFO (First In First Out). This limits the amount of data, and, eventually, how far back is possible to go back to restore. Thus, when the buffer space becomes full, GoBack starts to delete its earlier checkpoints and storage of earlier data.

Goback's technology is based on a file level monitoring and logging technique. It needs to consume a large chunk of the hard disk space to create a history change file. The monitoring system picks up every file change, regardless of whether or not it is worth it. A simple system restart will generate hundreds of file changes to log. The details of file change history logging consumes the hard disk space quickly and puts tremendous pressure on system resources.

Accordingly, there is a need in the art for an effective and efficient method of continuous backing up data, with minimal time and effort, so data backup process allows a computer system to remain online, with possibility to restore data from the backup in the point of time forewent the system failure and in the pre-selected point of restoration.

SUMMARY OF THE INVENTION

Accordingly, the present invention provides a system and method for continuous data protection includes a storage device a backup storage device, and an intermediate block data container operable to store block data that substantially obviates one or more of the disadvantages of the related art.

As described below, with continuous data protection, data can be restored from a continuous incremental backup at the point of time before system failure. Also, a user can select the restoration points for recovery, as in the case of traditional incremental backup. The continuous data protection is based on block-level monitoring.

The continuous data protection procedure is performed as two parallel processes: copying a data block from the storage device into the backup storage device (creating an initial backup), and copying the data block to be written to the data storage into the incremental backup. When a write command is directed to a data storage block, it is intercepted and redirected to the backup storage, and data, which is to be written in accordance with the write request, is written to the incremental backup on the backup storage.

If the write command is also directed to a data storage block identified for backup that has not yet been backed up, the identified data storage block is copied from the storage device to the intermediate storage device, the write command is executed on the identified data storage block from the storage device, and the data storage block is copied from the intermediate storage device to the backup storage device. In case of an error accessing a block on the storage device, the block is marked as invalid. The intermediate storage device can be external to a file system of a computer that includes the storage device, or can be located on the same storage device, or can be a separate partition of the storage device, or can be a file within a file system. The system suspends a write command to the storage device during the initial data backup process if the intermediate storage device has reached a selected data capacity; and copies a selected amount of data from the intermediate storage device to the backup storage device.

Thus, up-to-the-minute data are backed up in the last incremental backup that is open for editing. In case of, for example, system failure, such as a system crash, the last changed data can be restored and will not be lost. Also, system as a whole can be restored after the system crash.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

Figure 4:
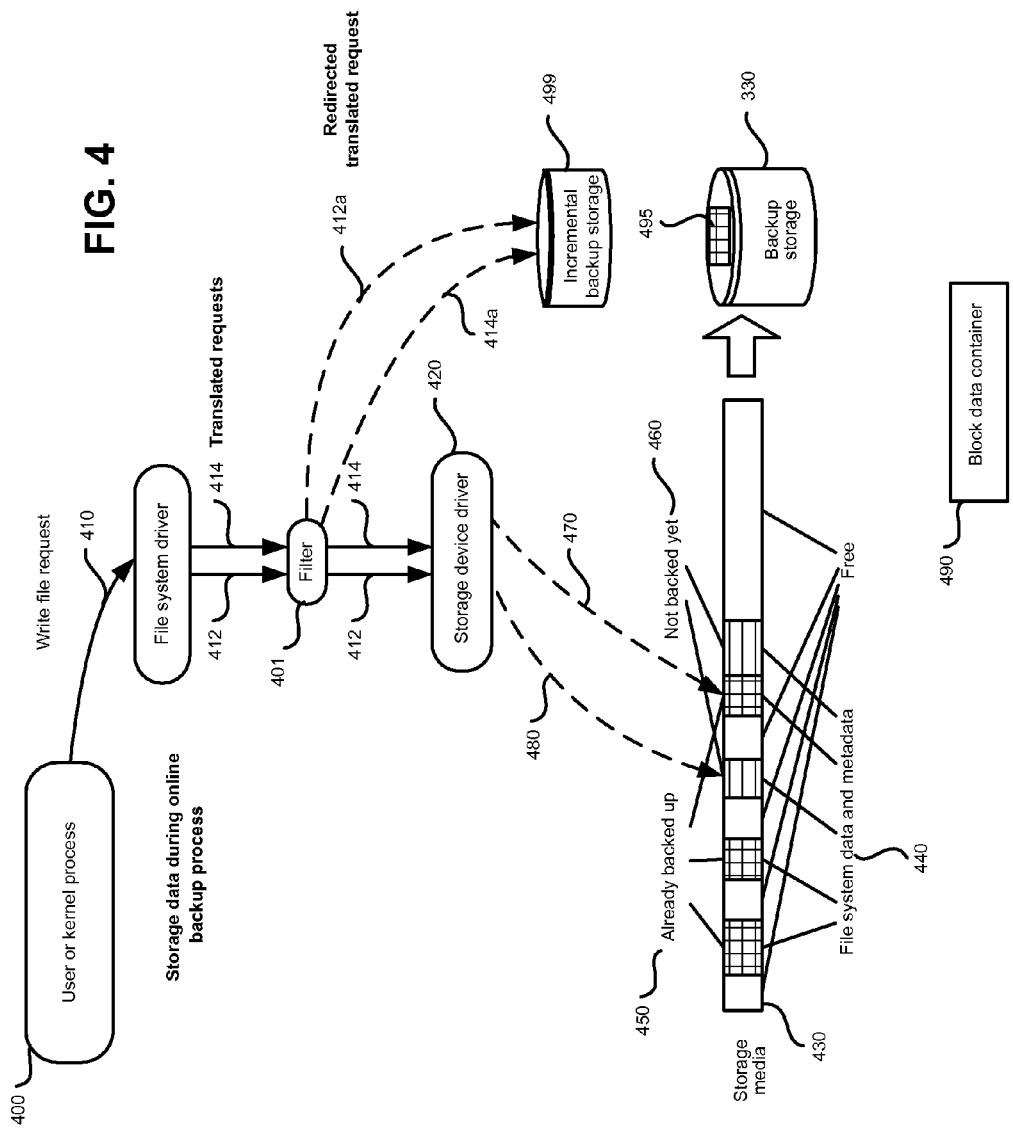
Figure 5:
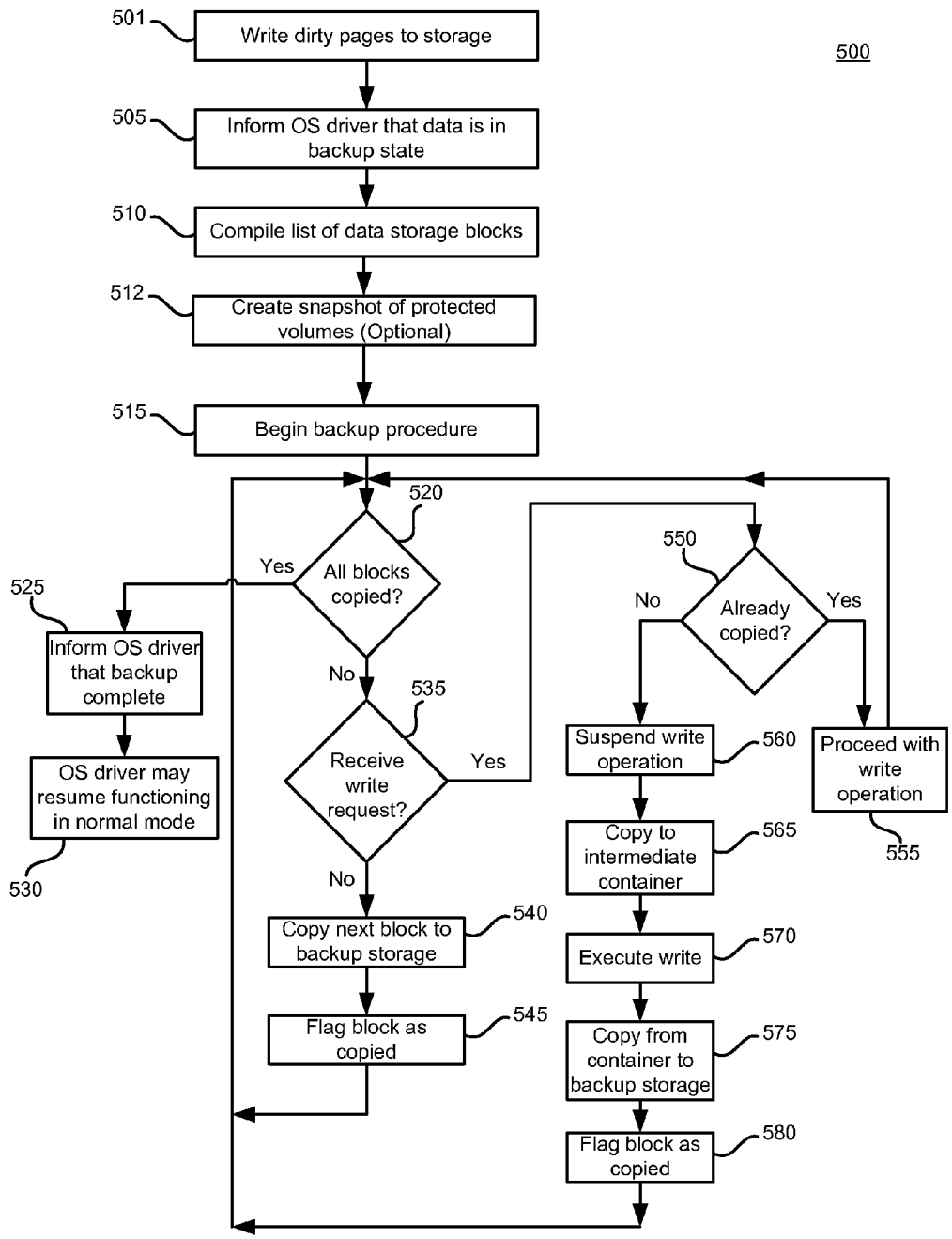
Figure 6:
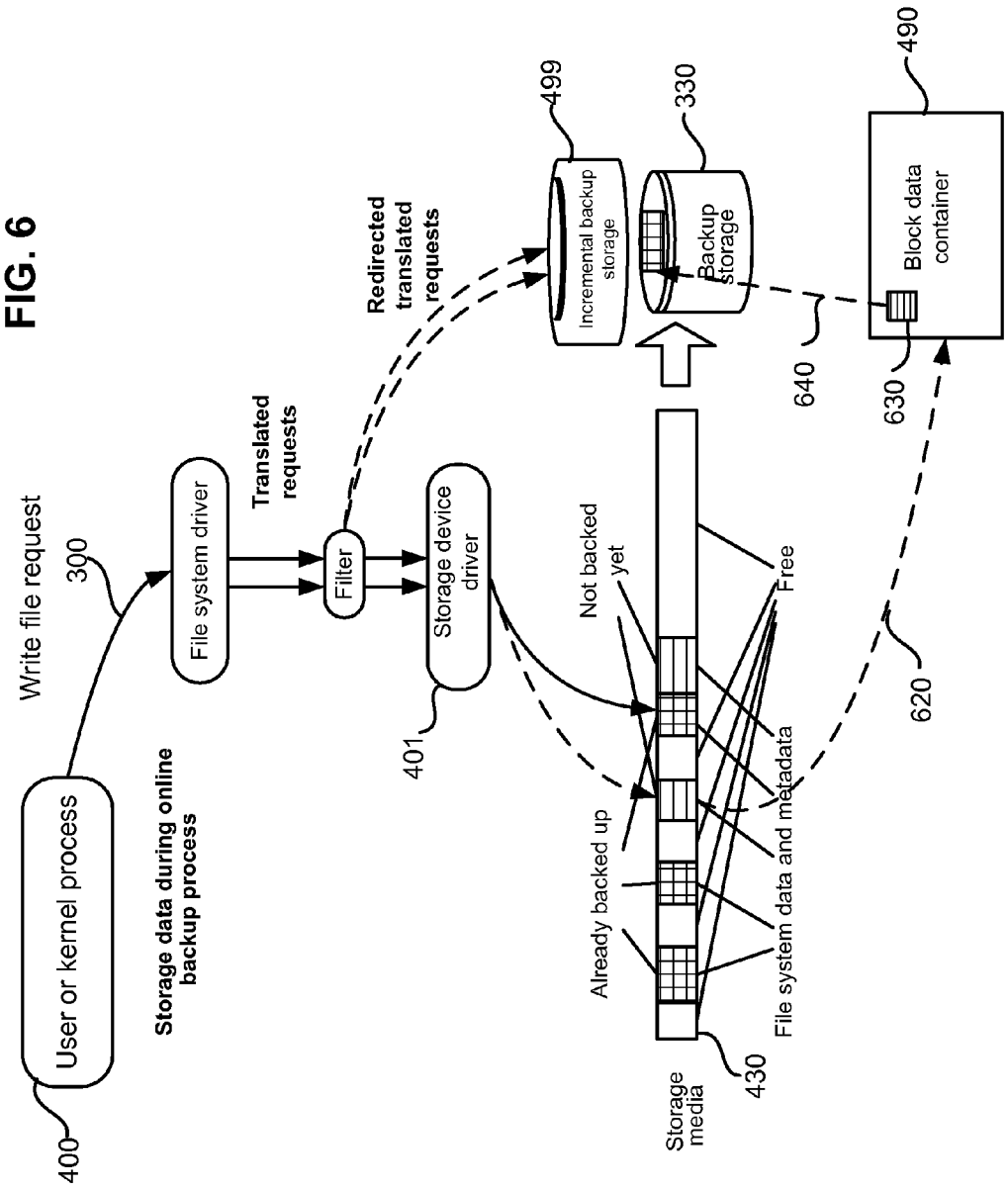
Figure 7:
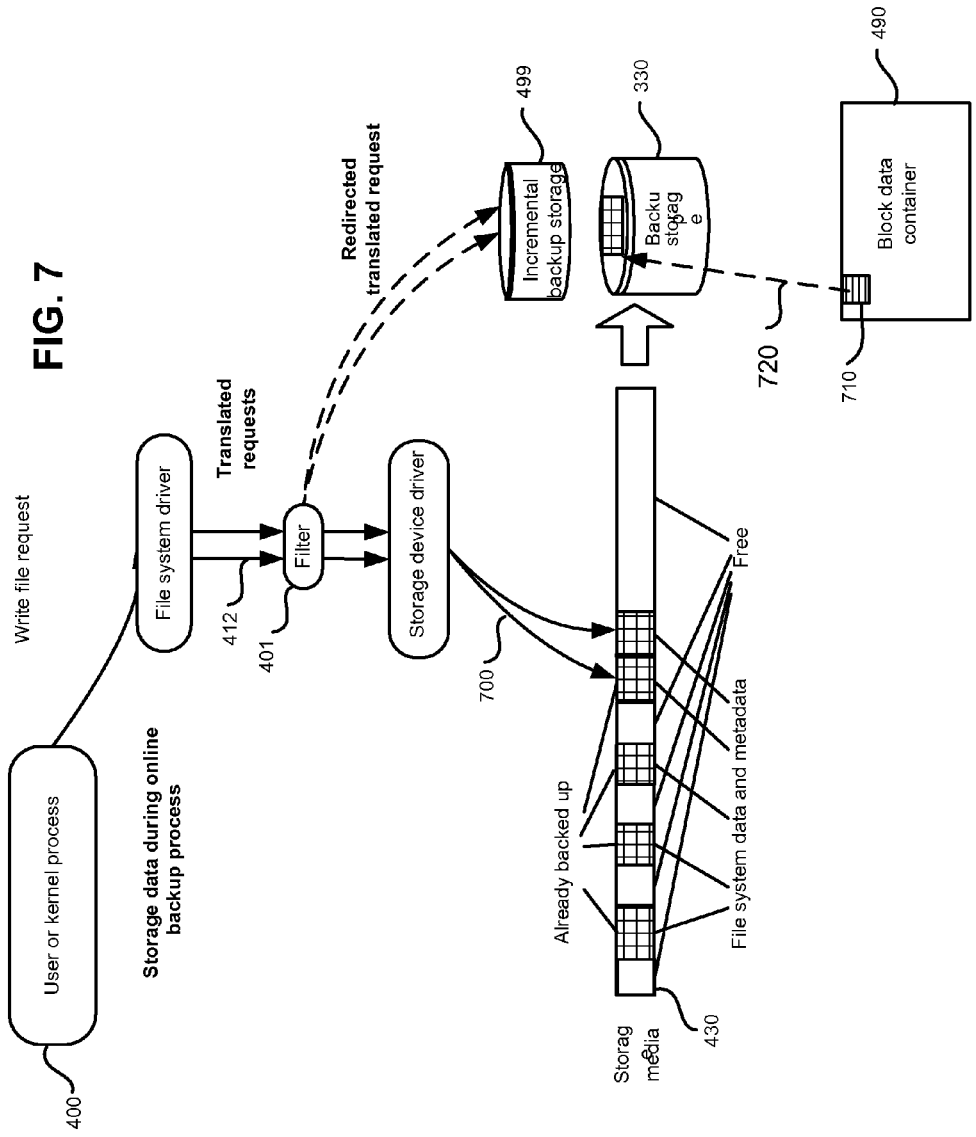

FIGS. 3(a), 3(b) and 3(c) show the process of initial data backup;

FIG. 4 shows an exemplary embodiment of the continuous data backup process of the present invention;

FIG. 5 shows a flow chart illustrating the method of online initial data backup of the present invention;

FIG. 6 shows an exemplary embodiment of the continuous data backup process of the present invention;

FIG. 7 illustrates a process for copying data from the block data container to the backup storage device.

Figure 8:
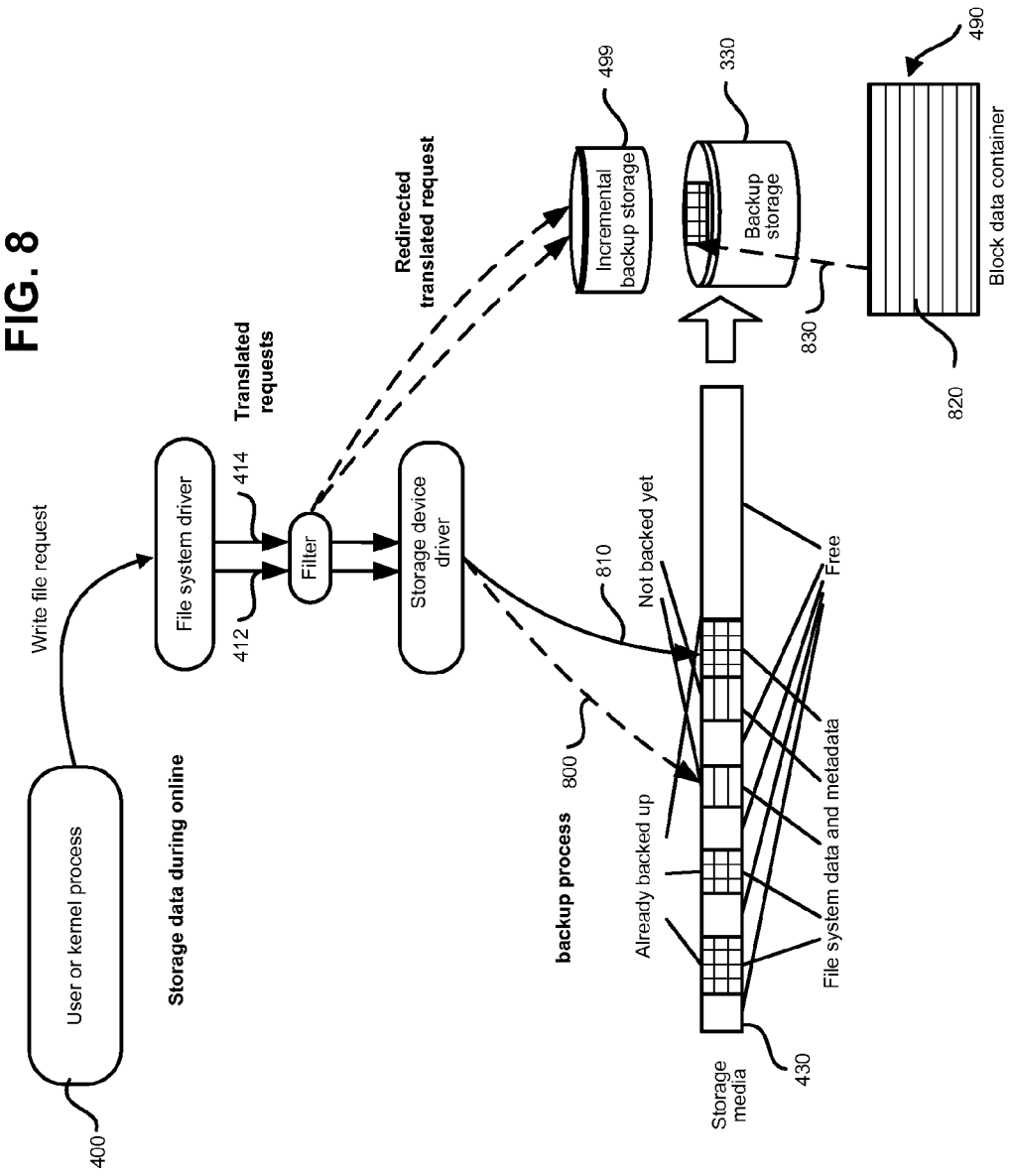

FIG. 8 illustrates handling an overflow of the block data container.

Figure 9:
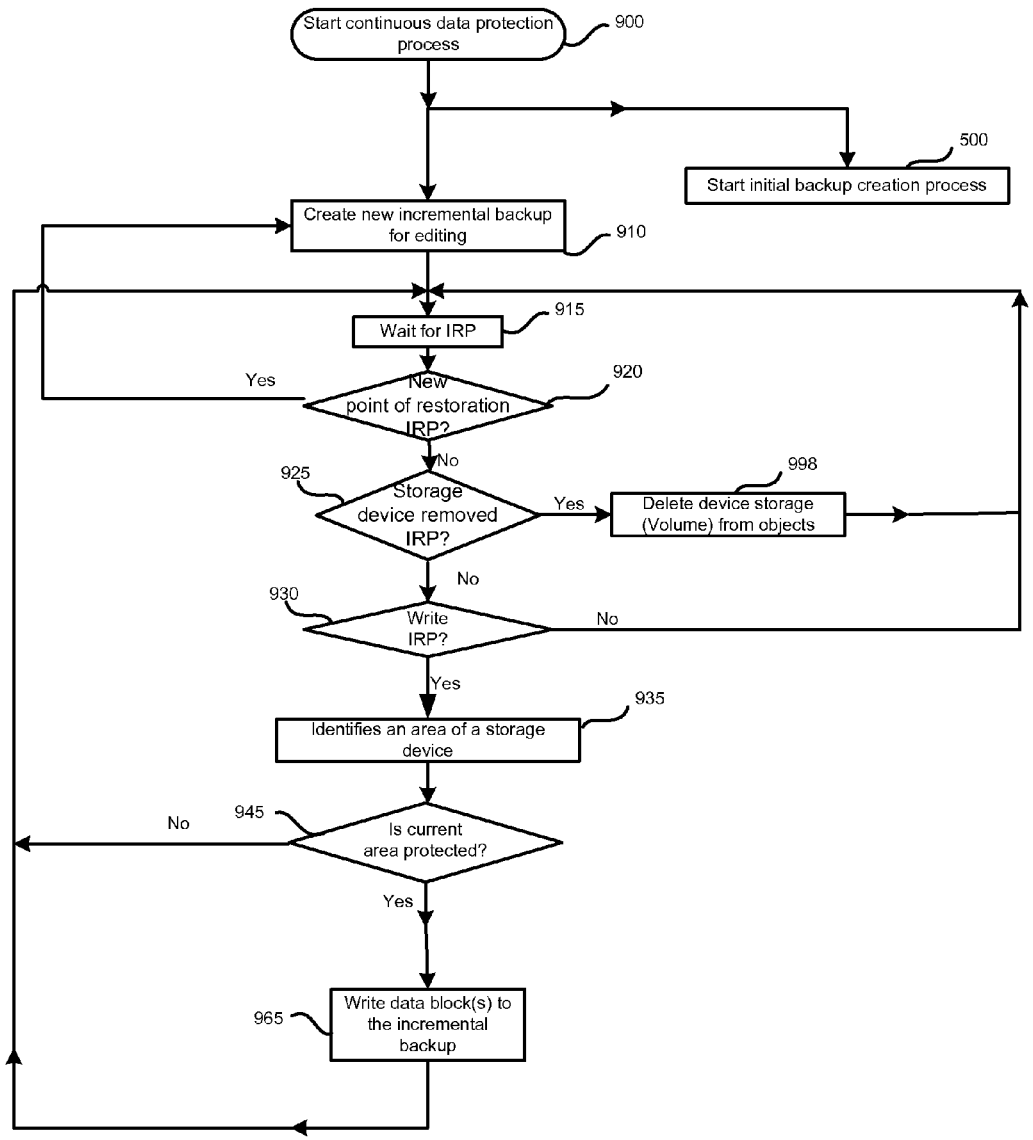

FIG. 9 shows a flow chart of continuous data backup procedure.

FIG. 10 illustrates an internal structure of the incremental backup.

Figure 11A:
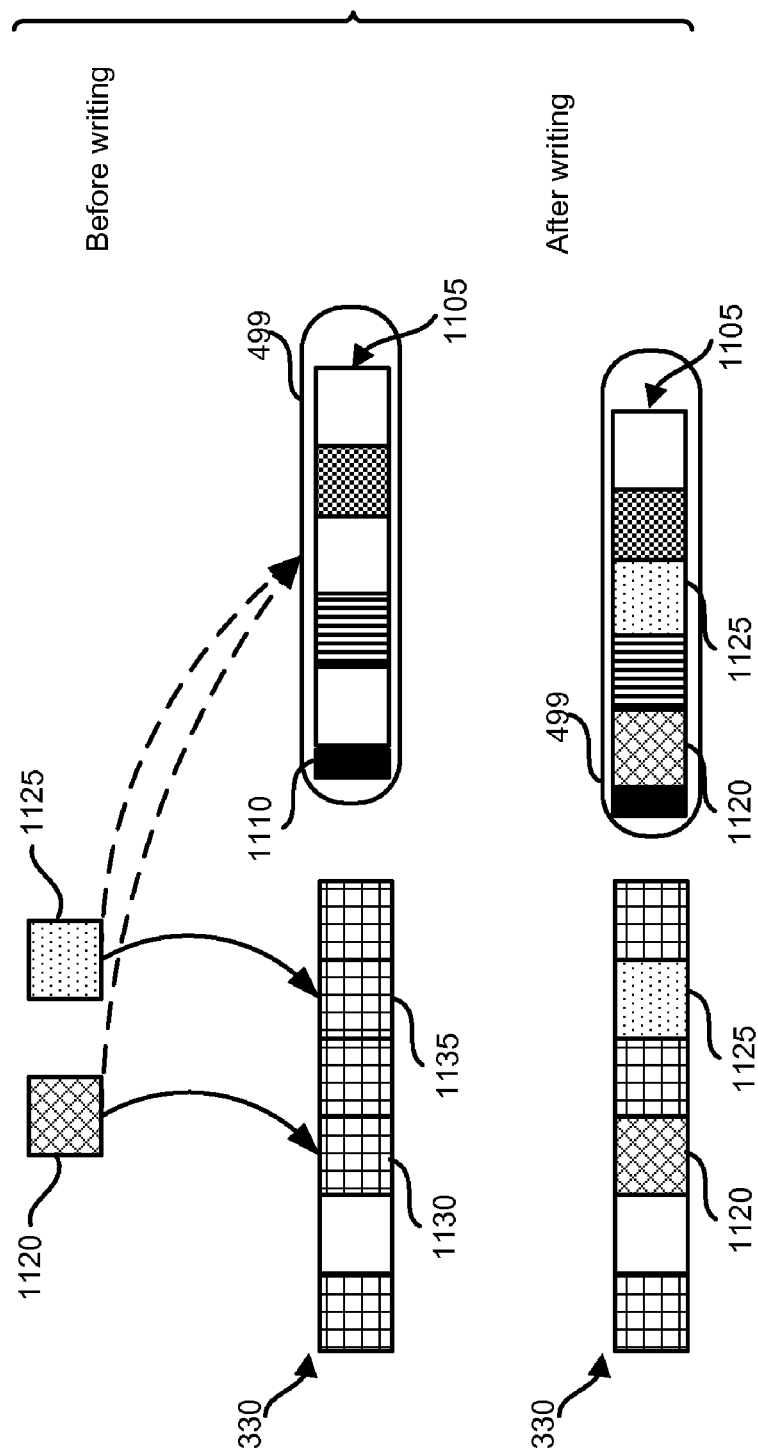
Figure 11B:
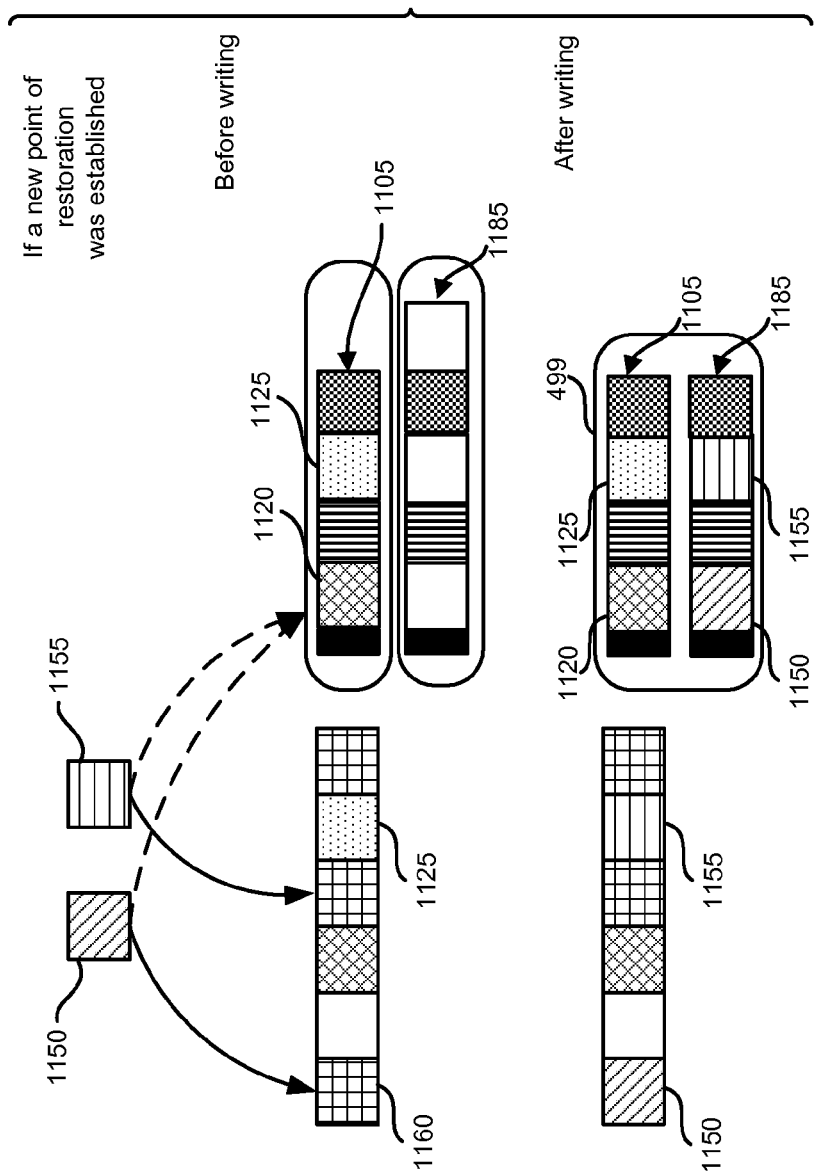
Figure 11C:
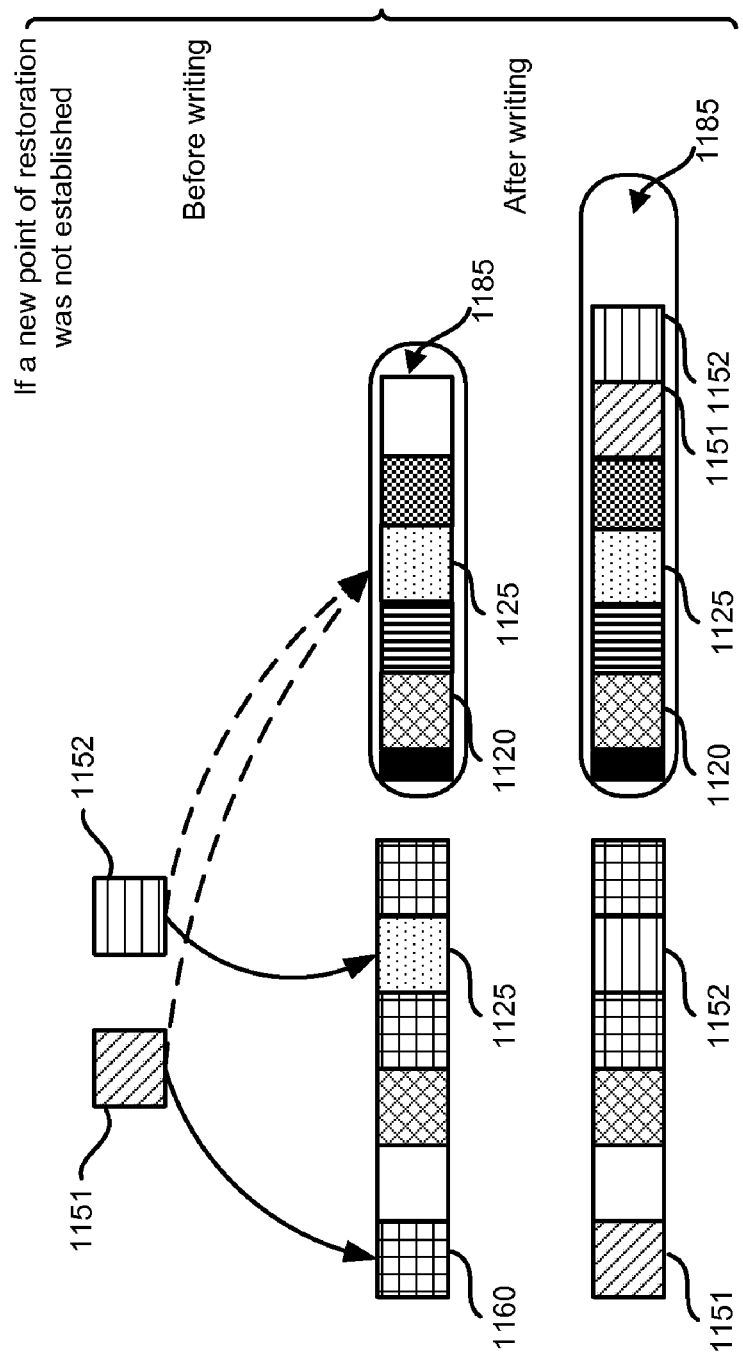

FIGS. 11(a)-11(c) show another exemplary embodiment of the continuous data backup process.

Figure 12:
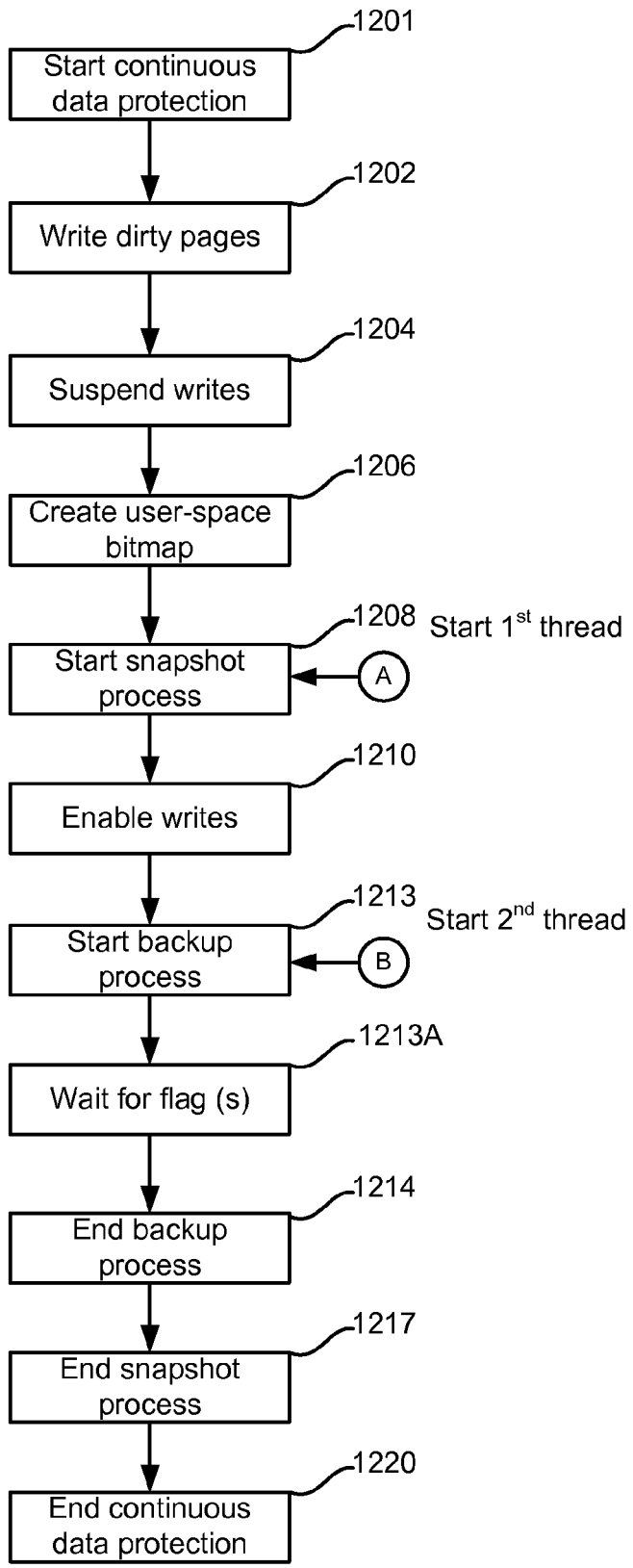

FIG. 12 illustrates an alternative embodiment of the present invention.

Figure 13:
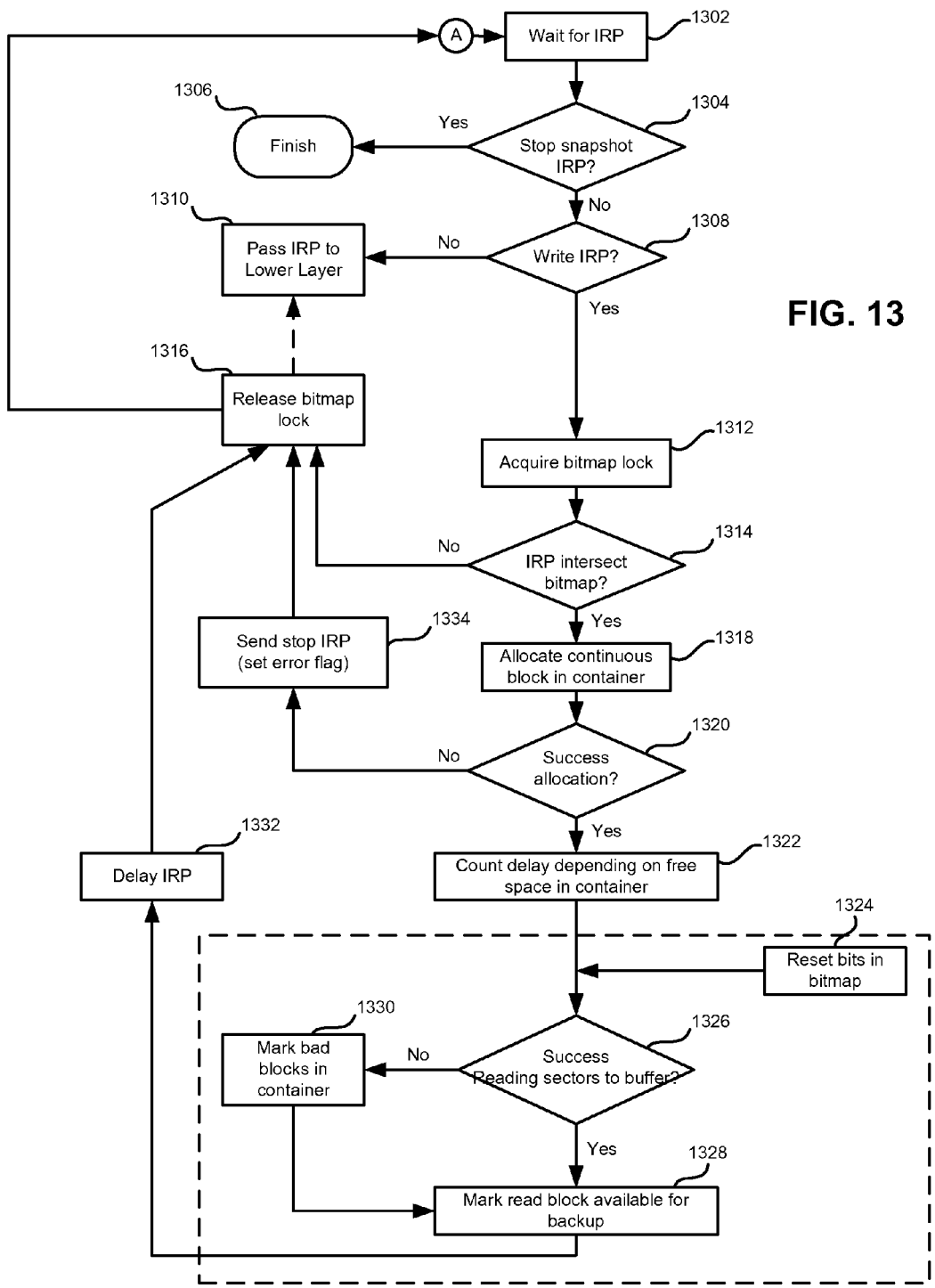

FIG. 13 illustrates the snapshot process of the embodiment of FIG. 11.

Figure 14:
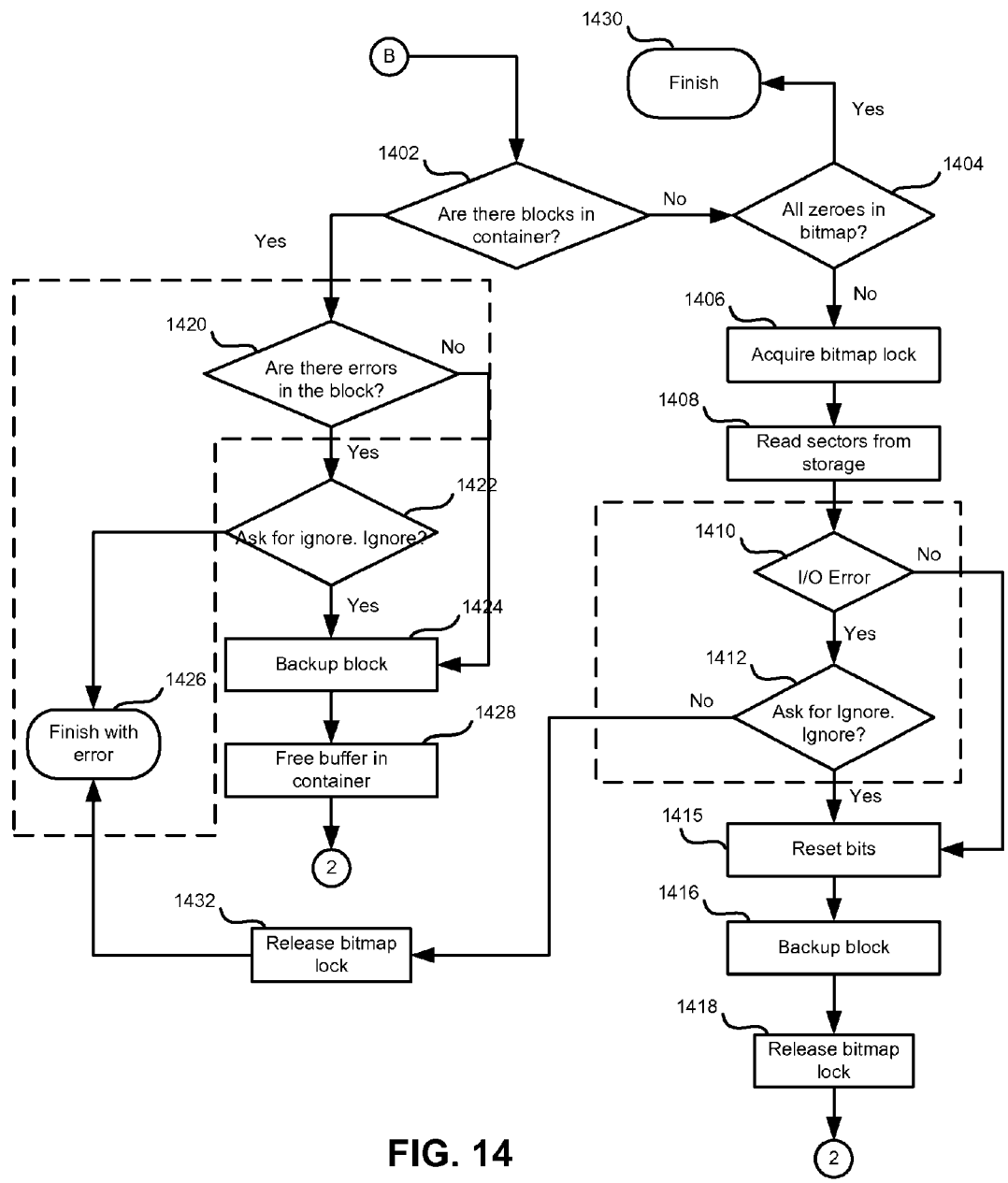

FIG. 14 illustrates the process of working with the intermediate storage container that is used for backup.

Figure 15:
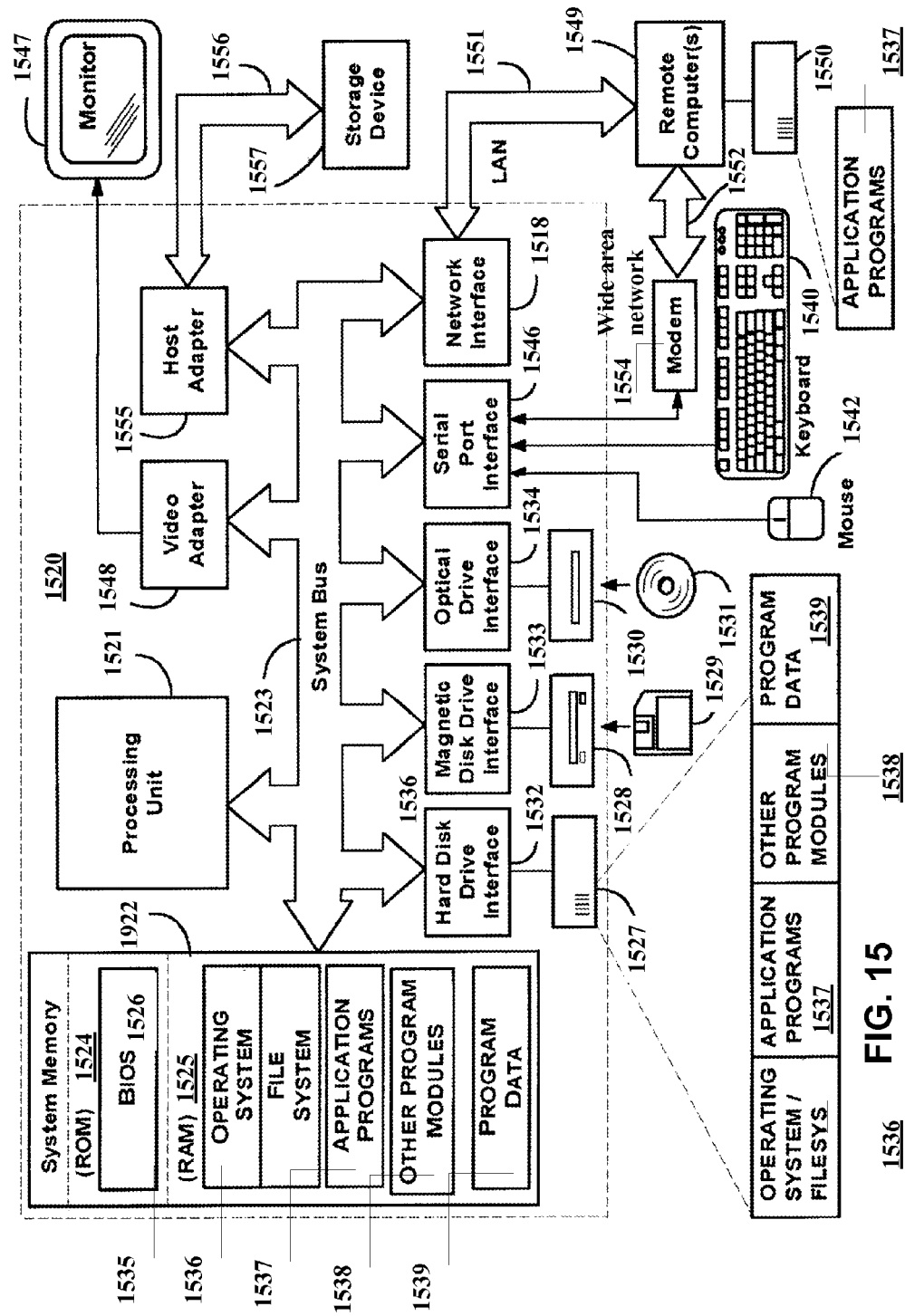

FIG. 15 illustrates an example of a computer architecture that may be used in the present invention.

DETAILED DESCRIPTION OF EMBODIMENTS OF THE INVENTION

Reference will now be made in detail to the embodiments of the present invention, examples of which are illustrated in the accompanying drawings.

The computer file system is usually located on the data storage device and typically interacts with storage device at the level of blocks. For example, read and write operations are performed in connection with data areas that have sizes that are divisible by the size of one block. The sequence of the blocks in the storage is ordered and each block has its own number. The computer system may include several such storage devices and the file system may take only a portion of one such storage, the whole storage, or several such storages or their parts. On the disk or storage device, these type of storages are usually located in partitions, taking the entire partition.

Figure 1:
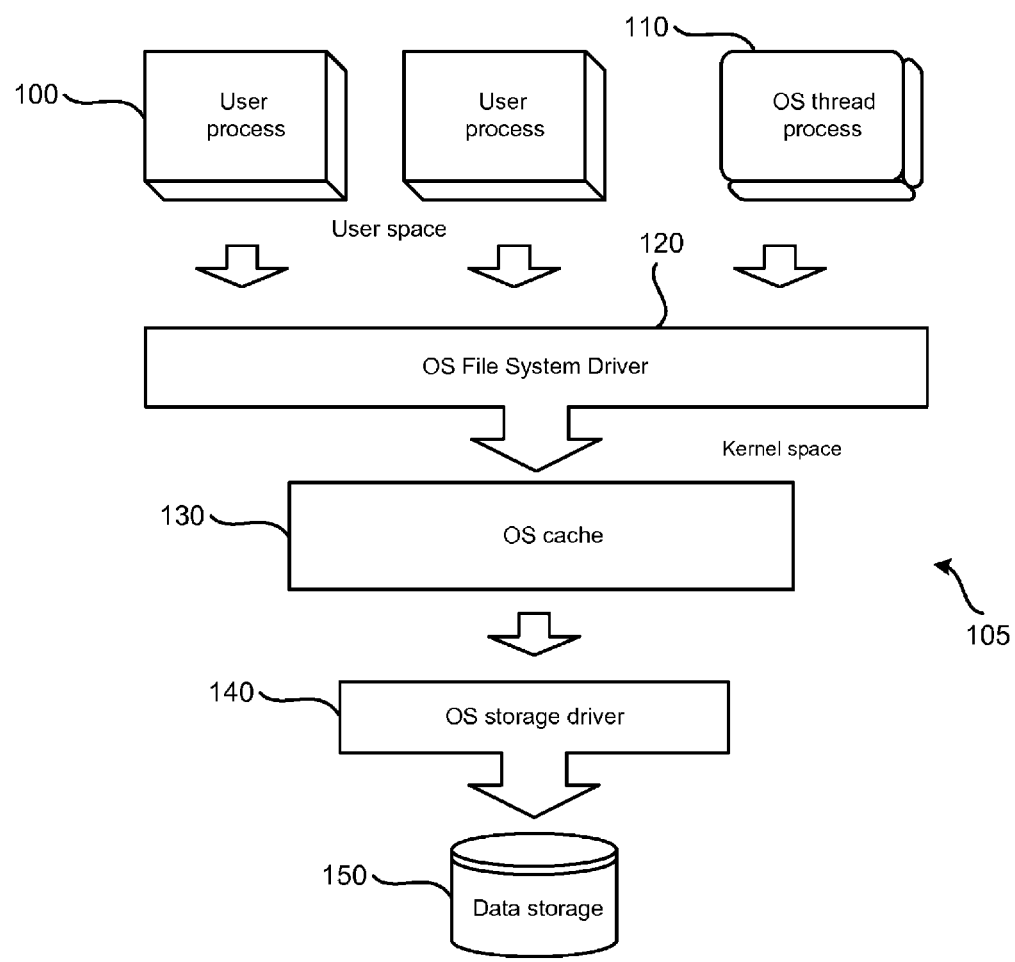
FIG. 1 shows an exemplary processes and objects in a computer system of the present invention.

The file systems may be subdivided into several categories, including the housekeeping data of the file system volume, file metadata, file data, and free space not occupied by the other data. A file system driver embedded into the operating system may provide the servicing for the file system. FIG. 1 shows an exemplary embodiment of the computer system of the present invention, shown generally at 105. The computer system 105 includes a data storage device 150 that may be accessed by one or more user processes 100 or OS thread processes 110. OS user processes 100 or OS thread processes 110 may request to read or write data to the data storage 150 via a file system request.

This request may be directed to the file system driver 120, which defines where in the data storage the relevant data blocks are located. The request can be then directed (optionally) to the OS cache 130 where the requested data may be currently cached. If the requested data is located in the OS cache 130, the system may complete the requested operation by allowing the user process 100 or OS thread process 110 to read and write of the cached data. If the requested data is not located in the OS cache 130 or is otherwise unavailable (e.g., the space in cache must be freed pursuant to an OS algorithm), the request is transmitted for execution to the OS storage driver 140. The OS storage driver subsequently performs the requested operation on the selected data located in the data storage 150.

The OS storage driver 140 may interact with the storage device 150 in block mode. As discussed above, in the context of data management, a block is a group of records on a storage device. Blocks are typically manipulated as units. For example, a disk drive may read and write data in 512-byte blocks. Accordingly, the OS storage driver 140 may receive requests for data read and write using blocks of the selected block size. Typically, each data block is associated with a number or label corresponding to the type of operation to be performed. Thus, the driver associated with the data write operation acquires a set of numerical pairs (e.g., the data block and number) in order to process the data write command.

Figure 2:
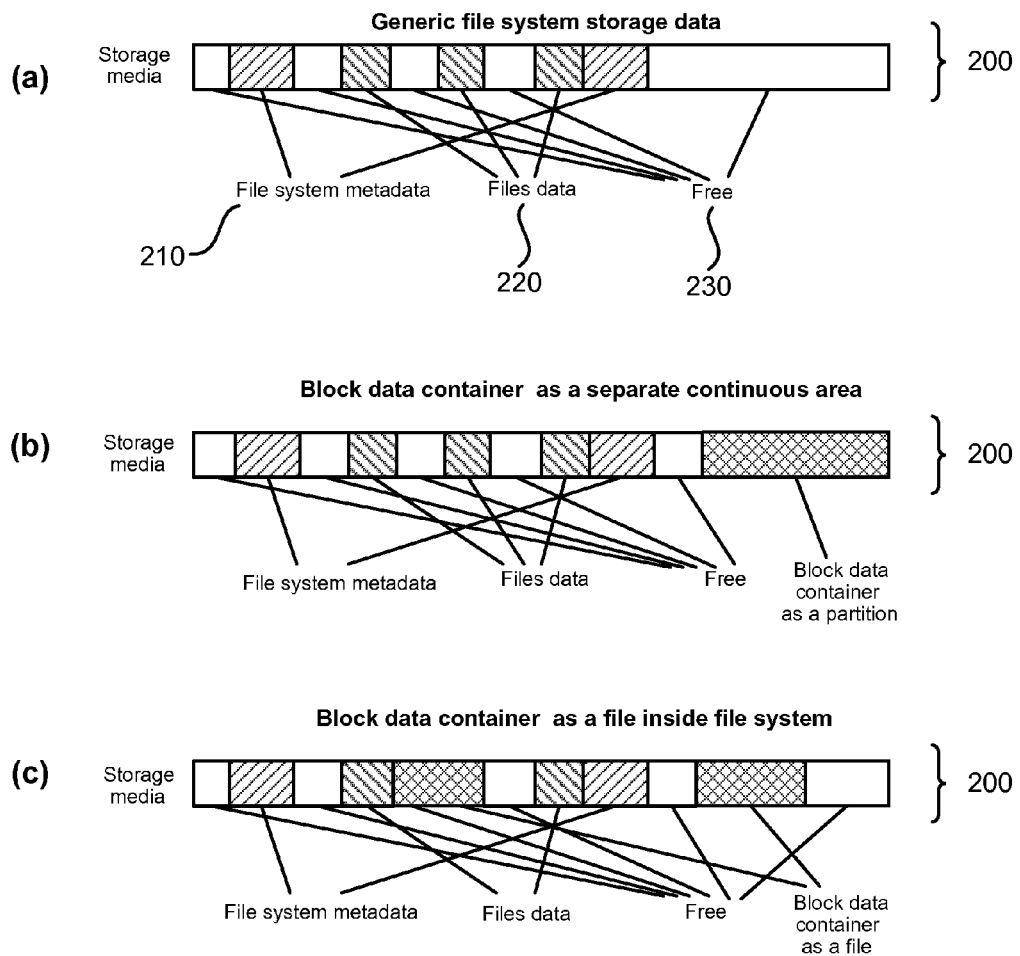
FIG. 2 shows exemplary embodiments of the system storage, including exemplary embodiments of the intermediate block data container for data backup.

FIG. 2 illustrates an exemplary embodiment of the system storage device. Storage medium 200 is a file system storage data device or location. From the point of view of the file system, the blocks of data stored in the block data storage medium 200 can be characterized into several different classes. Depending on the file system type, the storage medium 200 can store data specific for the volume, metadata of the file system 210, file data 220, or free space 230 not currently taken by other data. Generally, a specific data type may be allocated to an entire data block and different data types cannot be combined in one block. But under specific circumstances, a file system may combine different data into one block (e.g., ReiserFS or Microsoft Windows NTFS).

Thus, by copying all data blocks that are not free (e.g., all blocks except for entirely free blocks 230), the system may obtain a file system snapshot that serves as a copy of its state at a current moment of time. Although listing the file system blocks is not a requirement, listing may be used to optimize the space used by the backup procedure. In the event this information cannot be acquired by the system, the block fetching procedure may select all of the blocks associated with storing any file system data, including free blocks.

As discussed above, a data backup operation is time consuming. Thus, in order to conform backed up data with any specific state at a given moment, the data being copied must not change before the backup operation is completed.

Typically, this task is not difficult if the data storage and the file system associated with the storage are not connected to any active computer or is otherwise blocked from data modification. Basically, the risk of nonconforming data is reduced if there are no processes able to modify data.

FIGS. 3(a)-3(c) illustrate a conventional consecutive write process of the file system data during a typical (e.g., offline)

data backup procedure. However, if the file system is connected to an active computer and there are file system processes and user applications working with data during the backup process (e.g., online backup), then the task becomes more complicated. On-line backup is typical for servers with a high level of accessibility, which, therefore cannot be stopped to allow backup to be completed. For the on-line backup a snapshot of protected area can be created (which is described in U.S. patent application Ser. No. 10,624,858, SYSTEM AND METHOD FOR USING FILE SYSTEM SNAPSHOTS FOR ONLINE DATA BACKUP, incorporated by reference), based on which the initial backup can be created.

Figure 3:
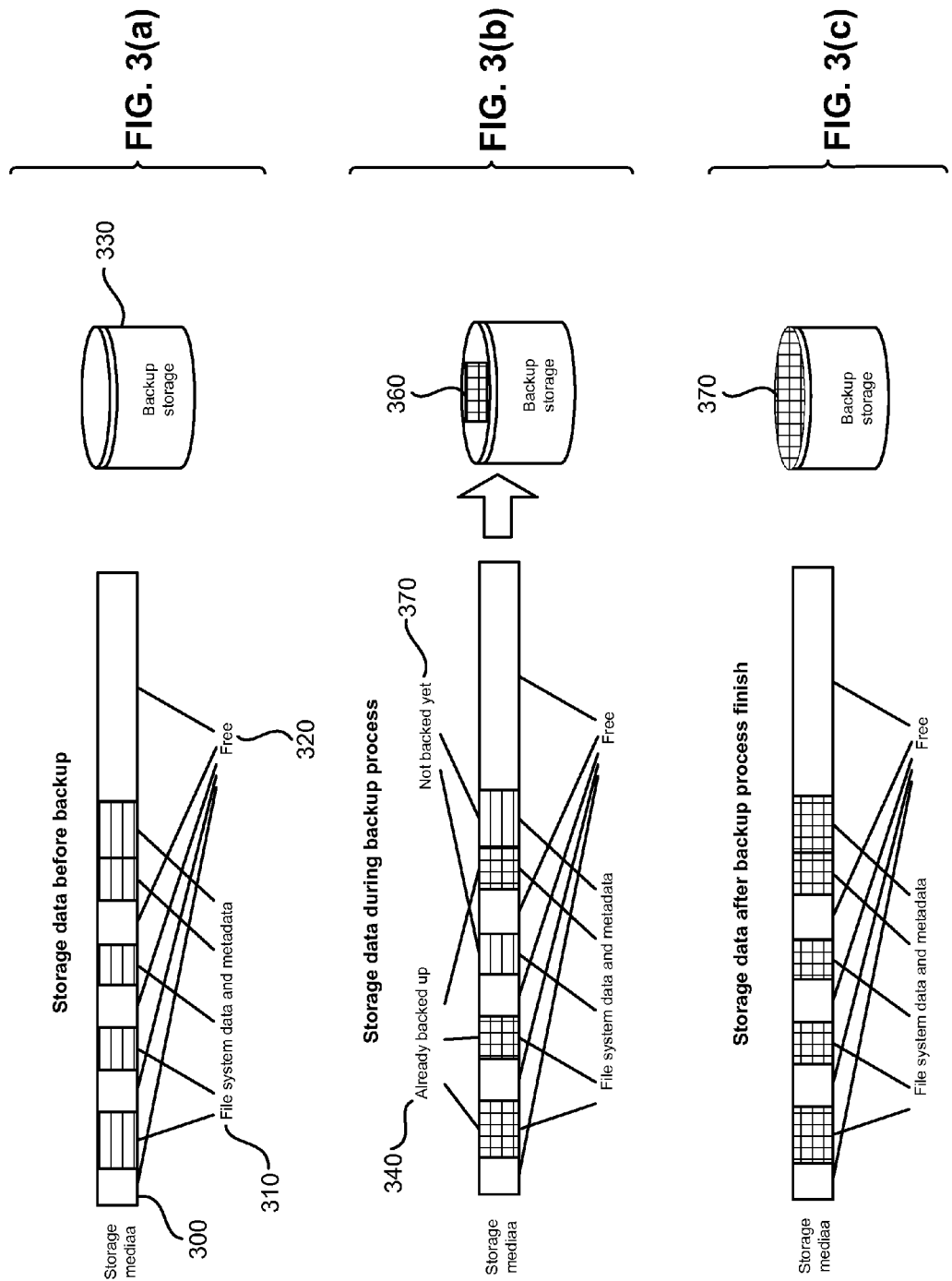

In order to carry out the data backup, the data storage medium 300 must be re-written to the backup storage 330. FIG. 3(*a*) shows the status of the storage data before the backup process has been initiated. In order to optimize the backup process by increasing performance and reducing space requirements, the system will only copy the occupied areas 310 and not the free blocks 320. During this process, as shown in FIG. 3(*b*), the file system data subject to backup may be in the two different states: (1) data that is already backed up 340 to the storage and (2) data that is not yet backed up, but only scheduled for backup 350. When backup is completed, as shown in FIG. 3(*c*), all of the data is now located in the backup storage 370, and the file system and main data storage are subsequently ready for user operations and access.

FIG. 4 illustrates an exemplary embodiment of the online backup process that addresses the shortcomings of offline data backup. For the purposes of illustration, the following example assumes that the backup process for the data of block data storage 330 is launched such that the backup process may be performed within the off-line backup procedure. Initially, a user process or file system process 400, such as, for example, a disk cache, issues a write request 410 to the data storage that is received by the file system driver. In response to write request 410, the file system driver transmits modification requests 412 and 414 (such as writing data to data storage device sectors from n to n+m, for example, from 120 to 150 sectors) to the storage device driver 420. In response to modification requests 412 and 414, the storage device driver 420 transmits modification requests, shown as 470 and 480, to the appropriate stored data. The modification requests 412 and 414 are also intercepted by the continuous backup filter 401 and redirected to incremental backup storage 499 as modification requests 412*a* and 414*a* (which are identical to original modification requests 412 and 414, with the exception for the destination place) to backup data, which are must be written in accord to write file request 410. So data, which will be written to data storage 330, is also written to incremental backup storage 499. This process will be described further below.

Also note that continuous data protection can be performed on the file level. In this case, continuous backup filter can be placed before the file system driver, which can intercept a write file (directory) request, issued by a user or kernel process. The Intercepted request(s) are then redirected to the incremental backup, for example, an incremental backup that is open for editing, so that data that is written to data storage device is also written to the incremental backup.

After the interception of the modification requests 412 and 414 by the continuous backup filter 401, they are passed to the storage device driver 420, which converting them to requests 470 and 480, which directed to the appropriate stored data on the storage device 330. Accordingly, the modification process may request the data 450 that has already been copied to the backup storage 495 (i.e., request 470) or data 460 that has not yet been copied or backed-up (i.e., request 480). Request 470 can be performed without damaging the backed up data, because the backup is a one-pass process that does not require a return to block of the storage device, which have already been backed up. But, in conventional systems, request 480 cannot be performed because the integrity of the backed-up data can be adversely affected. For example, a modified block that does not belong to the given copy can penetrate into the backup copy. This can make the correct recovery of the file system state impossible because data may refer to different points in time. As a result, the integrity of the data would be compromised.

In this example, the modification requests 470 and 480 are directed to data that is subject to the backup process 440. To solve this problem, one exemplary embodiment of the present invention includes a temporary data storage container 490 designed to address the situations discussed above and utilizes a method of data backing up into a backup storage, described below.

The backup procedure of the present invention operates at the level of the underlying file system and may be implemented with a file system based on a block storage principle. The method of the present invention includes a procedure to define the data and metadata of the file system by the number of the block to which the subject data belongs. For internal purposes, the backup procedure efficiently defines which blocks have been copied or are subject to being copied.

As discussed above, the intermediate data storage container 490 may be any storage device suitable for storing data. For example, intermediate data storage 490 may be a temporary buffer based on the block design of the data storage 330. Intermediate data storage container 490 may be a memory located external to the backed up data storage space 430. Alternatively, or in addition, intermediate data storage container 490 may be placed in a dedicated part of the data storage space 330, which can represent a separate partition of the storage (shown as block data container 240 in FIG. 2) or as a file within the file system (shown as block data container 250 in FIG. 2) that has been reserved for the purpose of providing a temporary data storage container.

FIG. 5 shows an exemplary embodiment of the online backup procedure of the present invention. The on-line backup procedure 500 of the present invention may begin with the step of informing the operating system driver responsible for servicing the data storage that the data is in the backup state, shown at step 505. In an alternative embodiment, the system may call an operating system cache reset procedure to write "dirty" pages into the data storage before informing the operating system driver about the initiation of the backup process, as shown at step 501. This procedure increases the actuality of the data stored in the snapshot.

After the system has informed the operating system driver, the system then compiles the list of data storage blocks at step 510. This list contains the file system data of different types that should be backed-up during the backup process. Once the list has been generated, the backup procedure may begin at step 515.

Also a snapshot of protected area of the data storage device can be created in step 512. During the on-line backup snapshot is used to not damage data on the storage device.

Until the system reaches the end of the list (see step 520) or receives a write request (see step 535), the system goes down the list and copies the blocks into the backup storage at step 540. On completion of each block backup the block is flagged or marked as backed-up, as shown at step 545. During the backup process, blocks preferably remain invariable. When the last block is backed-up or the backup procedure is canceled, then at step 525, the OS driver servicing the data storage is informed that the backup procedure is completed and the driver may continue functioning in the customary mode at step 530. Note that cancellation may be induced by the appearance of fatal errors, by a user's decision or by processes of the operating system.

The OS driver servicing the data storage is preferably able to communicate with system agents running the backup procedure. Once the backup procedure is initiated, this driver provides the backup procedure with the data block numbers that have been requested for write into the data storage by the operating system or a user process.

The backup procedure, depending on the state of its internal data, may be responsible for determining whether or not each requested block was copied to the backup storage. If the block was not copied, then the OS driver suspends the block write and waits until the block has been copied and subsequently released.

In one exemplary embodiment, the requested block may be released by continuing the backup procedure (e.g., when the requested block is next block in the backup sequence). But, the request processing time can be very long and usually this type of mode is unacceptable for online systems.

In another exemplary embodiment, the block release may be performed in connection with a specific container used as an intermediate data storage. FIG. 6 shows an exemplary embodiment of the present invention in which the system utilizes a block data container to manage the block release process. When the data storage driver receives a request to write a block into the area already copied by the backup procedure 310, the required write is performed without restrictions (as shown at step 555 in FIG. 5). The modification requests 412 and 414 are also intercepted by the continuous backup filter 401 and processed as described above with reference to FIG. 4, and as will be described below.

However, if the incoming write request (600 in FIG. 6) is directed to an area that is not yet backed-up, then the write process is suspended and the current state of the given data area is copied to the intermediate data storage container 490, see 620 in FIG. 6 (see also steps 560 and 565 in FIG. 5). When the copy procedure is completed, the system will allow the write procedure 600 to be executed (step 570 in FIG. 5). Thus, the content of the data block, shown as 630, at the moment the backup procedure commenced is stored in intermediate block container 490. The content 630 will be copied from container 490 by the backup procedure, as shown at 640 (and at step 575 in FIG. 5). The block will be flagged (as shown at step 580 in FIG. 5) and the backup process will continue. Note that the write procedure (shown at step 570) may be executed in parallel with the process of copying data from the intermediate block container to the backup storage device (shown at step 575). Accordingly, the system need not wait until the original write operation is complete to initiate the backup copy operation. Moreover, the step of writing the content of the intermediate block container 490 into the backup storage device 330 may be performed in a substantially asynchronous manner (e.g., it is not necessary to wait until the intermediate block container 490 is flushed to process the next incoming block write request if the container 490 has not over-flowed). Thus, the delays that result from writing to the main storage are reduced to a minimum, and the programs running on the computers connected to the data storage can continue working substantially without pause.

Data from the intermediate storage container can be rewritten to the backup storage when the write procedure of data located in the main storage has been completed or at any other appropriate time. FIG. 7 illustrates an exemplary embodiment of the process for copying data from the block data container 490 to the backup storage device 330. In this situation, although the backup process of the main storage is completed and write requests 700 directed to any regions of the data storage are performed by the driver immediately, i.e. without pending these write requests from the side of this invention. The modification request 412 is also intercepted by the continuous backup filter 401, as described above in reference to FIG. 4, and as will be described below. The system must still write the data 710 that is temporarily stored in the data container 490 to the backup storage 330, shown as 720 Thus, an additional write process 720 and routine computer activity may both occur in the concurrent mode, depending on the backup data storage.

FIG. 8 illustrates an exemplary embodiment of the present invention to handle an overflow of the block data container. If, during the write process to the intermediate block data container 490, the intermediate block data container 490 overflows, then the data write processes, shown as 800, to the unsaved area of the main storage device 330 should be suspended. The modification request 412 is also intercepted by the continuous backup filter 401 and processed as described above in reference to FIG. 4, and as will described below. In addition, the temporary data, via a write process shown as 820, in the intermediate block data container 490 should be written, shown as 830, to the backup storage 330 in order to free space for further storage. But, if the pending write requests 810 are directed to the data in the main data storage 330 that have already been copied, then the execution of these write requests 810 should preferably not be stopped. Note that it is not necessary to flush the container 490 completely into the backup storage 330. Generally, it is sufficient to partially free the container 490 to allow a suspended process to be resumed as soon as possible.

FIG. 9 shows an exemplary embodiment of the continuous data backup procedure. The continuous data backup procedure begins in step 900. After the start of continuous data backup procedure, creating of the initial backup 500 (described above) begins in parallel with the step 910, where an incremental backup that can be edited is created, with volume info header block. A volume info header block is used to store target volume properties, such as start sector, total number of sectors, file system type, a cluster size. Data, which must be written based on the write request, will be written to this incremental backup. Note that data can be written and rewritten to the incremental backup at any time, until a next incremental backup is created. When data block with the new data is coping to the incremental backup the check for this data block is executed. If data block with old data is already written to the current editable incremental backup, then this data block is rewritten by the new data, as will be shown in FIG. 11.

In step 915, the continuous data protection process waits for the interrupt request packet (IRP). Note that the IRP sometimes goes by different names, but, in general, is a request to the OS kernel to perform some action relating to the storage device, such as a write or a read on the storage device. Once the IRP is received, the IRP is analyzed. If the IRP is a new point of restoration type IRP (step 920), then the process goes back to step 910, where new incremental backup is created. The new point of restoration is the point when a new incremental backup is created to backup the storage device data. After a new incremental backup is created, a previous incremental backup is stored data, which was backed up in the incremental backup till a new incremental backup is created. From the moment a new incremental backup is created, data will not be backed up to a previous incremental backup, but will be backed up to a new incremental backup. The storage device data backed up in previous incremental backup can be restored back to the storage device, if user or administrator want to recovery data, which was backed up in the previous incremental backup, but not in the currently incremental backup.

Note, data from the data storages device(s) continuously backing up to the incremental backups. In other words, as soon as the storage device driver transmits modification request to the appropriate stored data, this request is intercepted by the continuous backup filter, and redirected to incremental backup storage to backup the data that is the subject of this request. After that, the intercepted request is passed to the appropriate stored data on the storage device. So data is written to the storage device and to the incremental backup storage, as shown on FIG. 4.

If it is not a new point of restoration IRP, then, in step 925 the continuous data protection process checks if this is a storage device removed type IRP (step 925). If the IRP is a storage device removed type IRP, then the process goes to step 998, where volume of this storage device and the storage device itself is deleted from the list of system objects. Then the process goes back to step 915 to wait for a new IRP. If it is not a storage device removed type IRP, then, in step 930, the continuous data protection process checks if this is a write IRP. If it is, then in step 935, the process identifies an area of a storage device to which the write request is directed. Note that the protected area of the data storage device can be a volume or partition of the data storage device, the data storage device as a whole, or a portion of the volume or partition of the data storage device.

In step 945 an area to which write request is directed is compared with the protected area of the data storage device. If this area of the data storage device is protected, then in step the data block of the write request is backed up to the incremental backup in step 965. whose place is determined in the currently selected object. If this area of the data storage device is protected, then the process goes to step 915.

After the data block is backed up in the incremental backup, process returns to step 915.

FIG. 10(*a*) illustrates an internal structure of the incremental backup. An incremental backup 1000 in FIG. 10(*a*) is appended to the end of regular backup. An incremental backup begins with partition info header block 1010, followed by an area where edited partition data is saved (1020) (logical block storage area), and ends with a backup list data block 1030. The partition info header block 1010 is used to store target partition properties such as start sector, total number of sectors, file system type, cluster size, etc.

Modified sector data, as well as all metadata of editing the incremental backup itself, is saved into the logical block storage area 1020. Data stored in the logical block storage area 1020 is saved as small, fixed-sized chunks. The size of such chunks is determined at the moment of mounting of backup for the first time, and is usually 16 KB. The logical block size should not be changed afterwards. All subsequent backups inherit this value from the first incremental backup.

Target partition sectors are stored as fixed sized chunks (usually 256K in length), which are saved as a chain of several logical blocks. The logical block storage area space is shared between partition sector data and metadata structures (chunk map and free blocks list).

A format of partition sectors chunk is shown in FIG. 10(*b*). Target partition sectors are grouped into chunks of fixed length. To optimize disk space usage, only clusters that have been modified are saved in chunks in saved clusters data area 1045. Therefore, each chunk has a cluster bitmap 1040 for identifying whether particular cluster data is actually contained within a chunk. As was stated above, all data in logical block storage area, included partitions sectors chunks, are stored as fixed-sized blocks. In case backup data compression is enabled, chunk data might take space that is not a multiple of block size. To indicate the actual size of data stored in chunk, a special DWORD field 1035 is supplied, whose value is calculated as follows:

Padding value=Total number of logical blocks in chunk*Logical block size−Saved clusters data size.

To optimize usage of disk space and to prevent fragmentation, data in logical block storage area 1020 can be saved as small data blocks. Each logical block can be found by its index, which can be assigned DWORD value, so the entire file space of backup can be represented by $2^{31}$−2 logical blocks.

To lookup the actual offset within backup where a particular logical block is stored, the chunk map 1050 is used. The chunk map can have multiple levels (1060*a* and 1060*b*) depending on logical block size and total number of sectors on target partition. The structure of chunk map is shown on FIG. 10(*c*).

Each chunk map entry occupies single logical block. The chunk map is organized in the same way as a binary search tree (but has a different in-memory representation). The linear logical blocks index space is transformed into a multilevel index as shown on. The upper level chunk map entries contain references to chunk map entries of the next lower level. The bottom level entries contain offsets (logical blocks numbers) of logical blocks belonging to a particular chunk.

The chunk map is used to map a logical block index, which corresponds to a serial number of logical block in the ordered sequence of logical blocks, to a "real" logical block number.

To lookup the offset of a particular logical block, first, the chunk map root entry is analyzed to find the logical block number of the next level chunk map entry. The process is repeated until the bottom level entry chunk map entry is found. The actual logical block number is extracted from the bottom level entry.

For efficiency reasons, a chunk map is not copied while creating a new incremental backup from the existing one. Instead, chunk map entries of the previous incremental backup are shared with the new backup. This allows processing of read requests using the existing chunk map entries. Chunk map entries are only copied if they are modified during write requests.

The copy-on-write mechanism involves using special bits in chunk map entries that signify that a particular chunk map entry is protected from modification. If such an entry is modified, it is first copied into the new logical block before real modification takes place. Upper level chunk map entries maintain the protection bits for lower level entries. Bottom level entries protect the logical blocks they are referencing from modification.

During the incremental backup inheritance, the chunk map root entry of the source incremental backup is copied into a new logical block, and the protection bits for all lower level entries in root entry are set to enable copy-on-write mechanism for them. Later, when a mapping between some logical block index and its corresponding logical block number is going to be changed, the following takes place:

a logical block number of the next-lower level chunk map entry is looked up in the chunk map root entry;

since it is marked as being copy-on-write protected, it is copied to a new logical block and all of its lower-level entries are protected by setting their protection bits;

a chunk map root entry is updated to point to the updated lower level entry; and the corresponding protection bit in root chunk map entry is cleared so that all further attempts to modify the updated lower level entry happen without triggering copy-on-write mechanism.

These steps are repeated for all lower level entries.

During processing of write requests, the bottom level entries are analyzed to find out whether a particular logical block is copy-on-write protected. If it is, the data is written into the new logical block and the bottom level chunk map entry is updated to point to reflect the changes.

When the compression is used, an overwritten chunk may require less space than its previous content. In that case, some logical blocks that were previously occupied by chunk data might become free and can be re-used. All free blocks are added to the Free Blocks List. Later when the new logical block will be needed, a request to Free Blocks List will be issued to find out whether there are any free blocks. If there is a free block in the list it is deleted from the list and re-used to store new data. When the Free Blocks List is queried for available free logical blocks, a logical block number of last written logical block is returned to provide a way to find a free block closest to the last written block to reduce backup fragmentation. If the proper value is not passed, a first free block in the list is returned.

During the process of restoration, a request to read a range of sectors from opened for editing backup, at first, a target chunk containing the sector data is determined. After this, a target cluster, which contains the requested sector data, is determined. And, finally, a cluster bitmap of current chunk is analyzed to see whether the target cluster is actually stored in the chunk. If the bit corresponding to the target cluster is set, the sector data is restored. If in the backup bitmap is set link to one of the previous backup, i.e., the current data block was not backed up in this incremental backup, then the process goes to pointed previous backup, from which data block will be restored, as described above.

Figure 10A:
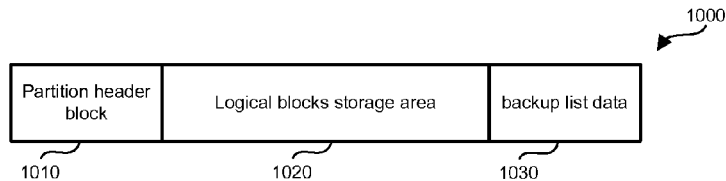
Figure 10B:
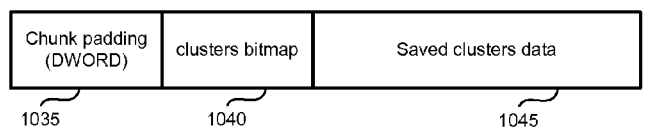
Figure 10C:
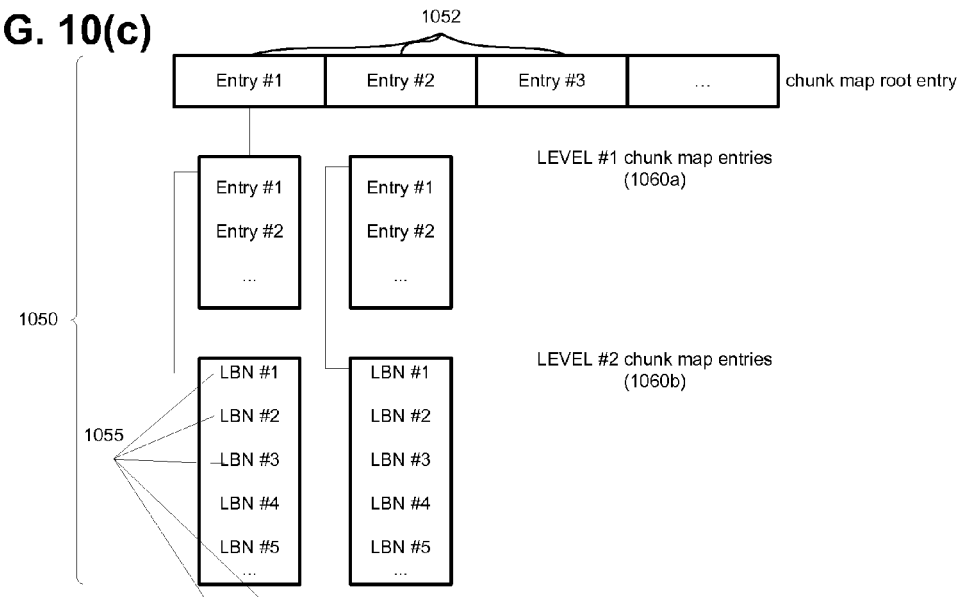
Figure 10D:
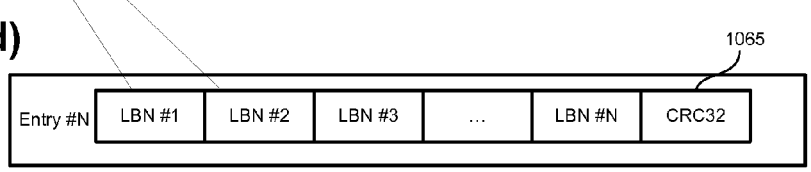

As shown on FIG. 10(d), chunk map entry can be described as an array of DWORD logical block numbers (LBN) which references lower level entries 1060a and 1060b (in case of top level entries) or logical blocks 1055 to which partition sectors chunk are saved. The array of logical block numbers is followed by CRC32 value (1065) to provide integrity protection.

Figure 10E:
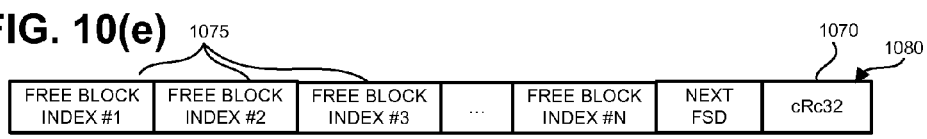

FIG. 10(e) shows a structure of the free blocks list. When partition sectors chunk is overwritten, it may occupy fewer logical blocks than its previous contents. In that case, all logical blocks that became free must be re-used later, when saving the data for other partition sectors chunk.

Free logical block numbers (1075) are inserted into the free blocks list (FBL) 1080, which is a sorted list of logical block numbers. The FBL size in memory is limited, so when it becomes full, a range of free logical block numbers contained in it is swapped into the logical blocks storage area to make room for new free blocks. The swapped ranges of free logical blocks can be loaded back into memory later when all free blocks stored in memory have been re-used. The array of Free Logical Block numbers is followed by the CRC32 value (1070) to provide integrity protection.

Before swapping the free block numbers into logical blocks storage area, they are packed into free space descriptor (FSD), which occupies single logical block.

FIGS. 11(a)-11(c) shows an exemplary embodiment of the continuous data backup process of the present invention. After the start of continuous data backup procedure, a new incremental backup 1105 is created with a volume info header block 1120. FIG. 11(a) shows a process of data writing to the storage device and to the incremental backup that just was created, so that the data block was not backed up to it.

After the write request is received, data of the block corresponding to this request data will be written to data storage 330 and also will be written to incremental backup 1105 on the incremental backup storage 499. A data block 1120 will be written to a storage device instead of the data block 1130, and a data block 1125 will be written to a storage device instead of the data block 1135, as determined by the storage device driver. Also, these data blocks will be backed up to the incremental backup 1105.

FIG. 11(b) shows a process of data writing to the storage device and to the incremental backup. But, in this case, a user or administrator created a new point of restoration, so the new incremental backup 1185 was created.

After the write request is received, data of the block corresponding to this request will be written to data storage 330 and also will be written to the incremental backup 1185 on the incremental backup storage 499. A data block 1150 will be written to a storage device instead of the data block 1160, and a data block 1155 will be written to a storage device, instead of the data block 1125, as determined by the storage device driver. Also these data blocks will be backed up to the incremental backup 1185.

If, after these data blocks are written to the incremental backup 1185, a system failure is take place, then user can restore data from the incremental backup 185. So all data, which was backed up before the system failure, can be restored.

Note that the process of data restoration from the incremental backup is not any different from the process of data restoration from the traditional incremental backup.

Also, a user can restore data, which was backed up in incremental backup 1105, i.e., data which corresponds to previous point of restoration.

FIG. 11(c) shows a process of data writing to the storage device and to the incremental backup. But, in this case user or administrator did not create a new point of restoration, so a new incremental backup 1185 was not created.

After the write request is received, the data of the block for this request data will be written to data storage 330 and also will be written to the incremental backup 1185 on the incremental backup storage 499. A data block 1151 will be written to a storage device instead of the data block 1160, and a data block 1152 will be written to a storage device instead the data block 1125, how it was determined by the storage device driver. Also, these data blocks will be backed up to the incremental backup 1185. Inasmuch as the data block 1125 was already backed up in the incremental backup 1185, the data block 1152 will be written to the incremental backup 1185, instead of the data block 1125.

FIG. 12 illustrates an alternative embodiment of the present invention. As shown in FIG. 12, in step 1201, the continuous data protection process begins. Note that the snapshot process may run asynchronously. In other words, once the continuous data protection process is launched, it can proceed in a separate thread, asynchronously relative to the process illustrated on FIG. 12. After the write file request is received, data blocks, which must be written based on the write file request, are backed up to the incremental backup. After step 1201, the "dirty pages" are written from the cache to storage (step 1202). Dirty pages are pages in an OS cache that contain information to be written into a storage device, but that have not been written due to an OS policy or other OS mechanisms (for example, a "lazy write" approach used in some modern OS). The next step (step 1204) suspends write operations. These suspended write operations are added to a special list, and a parameter is returned to the operating system, informing the operating system that these write operations have a "pending" status. In other words, the operating system will know that the write command execution has been postponed until later.

In step 1206, a user space bitmap is created. Drivers of the operating system are not used to create it. Rather, the storage medium (for example, a disk drive) is read directly, the file system structure is identified, and the data blocks that are being used are identified. It should be noted that although in the exemplary embodiment the bitmap is created on a data block level, it is possible that the bitmap build procedure is related to file system reflection into block space of the storage device, and considers only non-utilized blocks (vs. free blocks). Thus, those data blocks that are being used are tagged with, for example, a 1 in the bitmap, and those that are not used are tagged as 0 in the bitmap. Note that the size of the data block can be relatively large. For example, it may be larger than a typical sector in a hard disk drive. In other words, as discussed further below, there may be a need for a further step that determines which part of the data block is actually being used, if the data block is relatively large. Note that the values used in the bitmap can be not only binary 0 and 1. As another option, the bitmap can be used to store information about bad blocks. Note also that the bitmap can be created and managed in user space, or, alternatively, in OS kernel space.

In step 1208, the snapshot process begins, typically by initiating a thread, designated by A in FIG. 12 (see also FIG. 13). Note that the snapshot process may run asynchronously. In other words, once the snapshot process is launched, it can proceed in a separate thread, asynchronously relative to the process illustrated in FIG. 12.

In step 1210, the write operations are enabled. In step 1212, the backup process designated by B in FIG. 12 is started, see also B in FIG. 14. Note that the process B is also in asynchronous process, usually implemented as a thread. Also, note that processes A and B can be either synchronous or (preferably) asynchronous relative to each other. Synchronization can be performed using access to the bitmap as a serialization mechanism. In step 1214, once a flag is received that the backup process is completed, the snapshot process A can end (step 1217).

FIG. 13 illustrates the snapshot process A. As shown in FIG. 13, in step 1302, the snapshot process waits for the interrupt request packet (IRP). Note that the IRP sometimes goes by different names, but, in general, is a request to the OS kernel to perform some action relating to the storage device, such as a write or a read on the storage device. Once the IRP is received, the IRP is analyzed. If the IRP is a stop-snapshot type IRP (step 1304), then the process terminates (step 1306). If it is not a stop-snapshot IRP, then, in step 1308, the snapshot process A checks if this is a write IRP. If it is, then in step 1312, the process A waits for a bitmap lock. In other words, in step 1312, the bitmap is locked, and cannot be altered during the snapshot process A. If it is not a write IRP, then in step 1310, the IRP is passed to a lower layer (e.g., to the hardware layer of the local HDD) to be performed by the OS in a normal manner.

In step 1314, the process checks if the IRP corresponds to any bits in the bitmap that have been flagged as a used block (with a "1," for example). If not, then the process proceeds to step 1316, releasing the bitmap lock. Otherwise, in step 1318, in the intermediate block container, a space is allocated, such that the space is equal to the amount of data that needs to be stored there. Successful allocation is then checked (step 1320). If the allocation has not been successful, an error flag is set (step 1334), and the process returns to step 1316. The bitmap lock released in step 1316 and operation can either continue (step 1302), or pass the IRP to the lower layer (step 1310). If the allocation in step 1320 has been successful, then a counter to be used in the delay procedure is calculated/recalculated, depending on the amount of free space in the container (step 1322). Meanwhile, the bits in the bitmap are reset (step 1324), and data from the intermediate storage container is read. If the data has been read successfully, (step 1326), the block that is available for backup is marked (step 1328), otherwise, the block is marked as a "bad" block in the container (step 1330). After step 1330, the process proceeds to step 1328.

Note that the IRP can be delayed (step 1332), for example, by using a counter. Note that the delay process 1332 can influence the counter value as well.

FIG. 14 illustrates the process of working with the intermediate storage container that is used for backup. In step 1402, the process checks if there are any blocks in the intermediate storage container already. If there are none, then in step 1404, the process checks if the bitmap contains only zeros or does not contain used blocks (note that depending upon implementation, the bitmap can contain bad block marks as well). If "Yes", then the process ends in step 1430. If "No," the process proceeds to step 1406, which acquires the bitmap lock. Information about a sector from the bitmap in step 1402 is used to address backup procedure to the sector. The sectors are read from storage (step 1408), such that the sector correspond to the flagged bits in a bitmap. In step 1410, if there are no I/O errors, the process proceeds to step 1414, which resets the bits. In case of error, the system asks for user action in step 1412, for example, by creation of a dialog box on the console (e.g., by asking the user: "Error reading disk data. Cancel operation or ignore error?"). Alternatively, the response regarding the action to be taken can be received "in advance" by specifying some pre-defined error recovery policy. In other words, the error is not ignored, but the bitmap acquired in step 1406 is released, and the process is finished (with error).

Then in step 1415, the system resets appropriate bits in the bitmap. In step 1416, the block is backed up, and in step 1418, the bitmap lock is released. In step 1410, if there is an error, (in other words, the particular sector cannot be read), then an error is generated, and some error handling routine 1412 is involved. For example, interactive input from the user may be requested, or a pre-defined error handling approach may be used. If the received response indicates that the error cannot be ignored, the system finishes operation (step 1426).

In step 1412, if there is no "ignore," the bitmap lock is released (step 1432), and the process finishes with error (step 1426).

In step 1402, if there are copied blocks in the container, the system proceeds with backing it to the backup storage. But, in case of errors in the block (see 1420), the system asks the user (or checks a predefined policy) whether it should ignore the error (step 1422). If, in case of error, the error handling routine in 1422 returns a request to ignore the error, then the block is backed up (step 1424), and a buffer in the container is freed (step 1428). The process can then return back to step 1402. Otherwise, in step 1822, the process finishes with an error (step 1426), as described above.

With reference to FIG. 15, an exemplary system for implementing the invention includes a general purpose computing device in the form of a personal computer or server 1520 or the like, including a processing unit 1521, a system memory 1522, and a system bus 1523 that couples various system components including the system memory to the processing unit 1521. The system bus 1523 may be any of several types of bus structures including a memory bus or memory controller, a peripheral bus, and a local bus using any of a variety of bus architectures. The system memory includes read-only memory (ROM) 1524 and random access memory (RAM) 1525. A basic input/output system 1526 (BIOS), containing the basic routines that help to transfer information between elements within the personal computer 1520, such as during start-up, is stored in ROM 1524. The personal computer 1520 may further include a hard disk drive 1527 for reading from and writing to a hard disk, not shown, a magnetic disk drive 1528 for reading from or writing to a removable magnetic disk 1529, and an optical disk drive 1530 for reading from or writing to a removable optical disk 1531 such as a CD-ROM, DVD-ROM or other optical media. The hard disk drive 1527, magnetic disk drive 1528, and optical disk drive 1530 are connected to the system bus 1523 by a hard disk drive interface 1532, a magnetic disk drive interface 1533, and an optical drive interface 1534, respectively. The drives and their associated computer-readable media provide non-volatile storage of computer readable instructions, data structures, program modules and other data for the personal computer 1520. Although the exemplary environment described herein employs a hard disk, a removable magnetic disk 1529 and a removable optical disk 1531, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 1529, optical disk 1531, ROM 1524 or RAM 1525, including an operating system 1535 (preferably Windows™ 2000). The computer 1520 includes a file system 1536 associated with or included within the operating system 1535, such as the Windows NT™ File System (NTFS), one or more application programs 1537, other program modules 1538 and program data 1539. A user may enter commands and information into the personal computer 1520 through input devices such as a keyboard 1540 and pointing device 1542. Other input devices (not shown) may include a microphone, joystick, game pad, satellite dish, scanner or the like. These and other input devices are often connected to the processing unit 1521 through a serial port interface 1546 that is coupled to the system bus, but may be connected by other interfaces, such as a parallel port, game port or universal serial bus (USB). A monitor 1547 or other type of display device is also connected to the system bus 1523 via an interface, such as a video adapter 1548. In addition to the monitor 1547, personal computers typically include other peripheral output devices (not shown), such as speakers and printers. A data storage device 1557, such as a hard disk drive, a magnetic tape, or other type of storage device is also connected to the system bus 1523 via an interface, such as a host adapter 1555 via a connection interface 1556, such as Integrated Drive Electronics (IDE), Advanced Technology Attachment (ATA), Ultra ATA, Small Computer System Interface (SCSI), SATA, Serial SCSI and the like.

The personal computer 1520 may operate in a networked environment using logical connections to one or more remote computers 1549. The remote computer (or computers) 1549 may be another personal computer, a server, a router, a network PC, a peer device or other common network node, and typically includes many or all of the elements described above relative to the personal computer 1520 may further include a memory storage device 1550. The logical connections include a local area network (LAN) 1551 and a wide area network (WAN) 1552. Such networking environments are commonplace in offices, enterprise-wide computer networks, Intranets and the Internet.

When used in a LAN networking environment, the personal computer 1520 is connected to the local area network 1551 through a network interface or adapter 1553. When used in a WAN networking environment, the personal computer 1520 typically includes a modem 1554 or other means for establishing communications over the wide area network 1552, such as the Internet. The modem 1554, which may be internal or external, is connected to the system bus 1523 via the serial port interface 1546. In a networked environment, program modules depicted relative to the personal computer 1520, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer system providing online continuous data protection, the computer system comprising:
   a storage device storing block data;
   a backup storage device storing block data; and
   wherein the computer system is operable to:
   creating a single bitmap of data storage blocks on the storage device that are subject to an initial backup;
   copying blocks marked in the bitmap as an initial backup to the backup storage device;
   in case of error when accessing the storage device, indicating in the bitmap, that the data storage block that caused the error is invalid;
   creating an editable incremental backup on the backup storage device, such as that any block in the editable incremental backup is subject to being rewritten so long as the editable incremental backup is open; and
   during the creation of the editable incremental backup, intercepting a write command directed to a data storage block marked in the bitmap and redirecting the write command to the editable incremental backup on the backup storage device, and
   for data that is to be written in the write command, writing the data to editable incremental backup on the backup storage by executing the redirected write command,
   wherein, if the data block that is the subject of the write command was backed up in a latest incremental backup, replacing the old data block in the latest incremental backup with the data block that is the subject of the write command,
   wherein the latest incremental backup reflects latest changed data on the data storage device; and
   after intercepting the write command, duplicating the write command on the data storage device.

2. The computer system of claim 1, further comprising creating a new incremental backup when a previous incremental backup is closed and not subject to editing.

3. The computer system of claim 1, wherein the computer system is further operable to restore the backed up data to the storage device from the current incremental backup.

4. The computer system of claim 1, wherein the computer system is further operable to restore the backed up data to the storage device from any previous incremental backup.

5. The computer system of claim 4, wherein the restoring is performed over a network.

6. The computer system of claim 1, wherein an intermediate block data container is used to store data that has not yet been backed up, wherein the computer system is operable to write a data block from the data storage device into the intermediate block data container and to then copy that data block from the intermediate block data container into the backup storage device.

7. The computer system of claim 1, wherein the incremental backup is opened for editing.

8. The computer system of claim 1, wherein the computer system is operable to:
- suspend a write command to the data storage device if the intermediate block data container has reached a selected data capacity; and
- copy a selected amount of data from the intermediate block data container to the backup storage device.

9. A method for providing continuous data protection for data stored on a data storage device of a computer system, the method comprising the steps of:
- creating a single bitmap of data storage blocks on the storage device that are subject to an initial backup;
- copying blocks marked in the bitmap as an initial backup to the backup storage device;
- in case of error when accessing the storage device, indicating in the bitmap that the data storage block that caused the error is invalid;
- creating an editable incremental backup on the backup storage device, such as that any block in the editable incremental backup is subject to being rewritten so long as the editable incremental backup is open; and
- during the creation of the editable incremental backup, intercepting a write command directed to a data storage block marked in the bitmap and redirecting the write command to the editable incremental backup on the backup storage device; and
- for data that is to be written in the write command, writing the data to the editable incremental backup on the backup storage by executing the redirected write command,
- wherein, if the data block that is the subject of the write command was backed up in a latest incremental backup, replacing the old data block in the latest incremental backup with the data block that is the subject of the write command,
- wherein the latest incremental backup reflects latest changed data on the data storage device; and
- after intercepting the write command, duplicating the write command on the data storage device.

10. The method of claim 9, further comprising creating a new incremental backup when a previous incremental backup is closed and not subject to editing.

11. The method of claim 9, further comprising restoring the backed up data to the storage device from the current incremental backup.

12. The method of claim 9, further comprising restoring the backed up data to the storage device from any previous incremental backup.

13. The method of claim 12, wherein the restoring is performed over a network.

14. The method of claim 9, wherein an intermediate block data container is used to store data that has not yet been backed up, wherein the computer system is operable to write a data block from the data storage device into the intermediate block data container and to then write that data block from the intermediate block data container into the backup storage device.

15. The method of claim 9, wherein the incremental backup is an opened for editing.

16. The method of claim 9, further comprising:
- suspending a write command to the data storage device if the intermediate block data container has reached a selected data capacity; and
- writing a selected amount of data from the intermediate block data container to the backup storage device.

17. A non-transitory computer useable storage medium having computer executable program logic stored thereon for executing on a processor, the computer executable program logic including a computer program code adapted to perform the method of claim 9.

* * * * *